Sept. 1, 1936. D. L. TAYLOR 2,052,854
METHOD OF AND MEANS FOR PACKING FRESH VEGETABLES
Filed Oct. 20, 1934
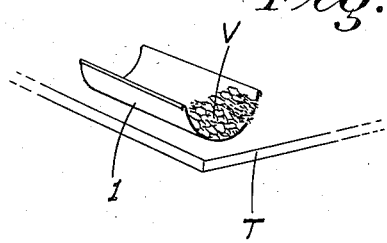
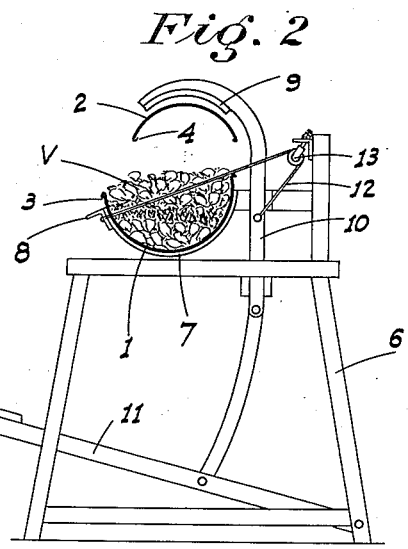
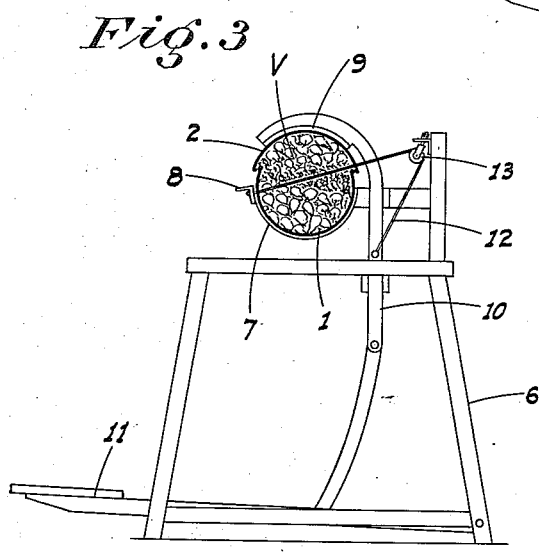
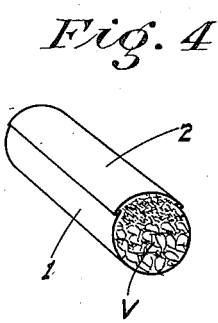
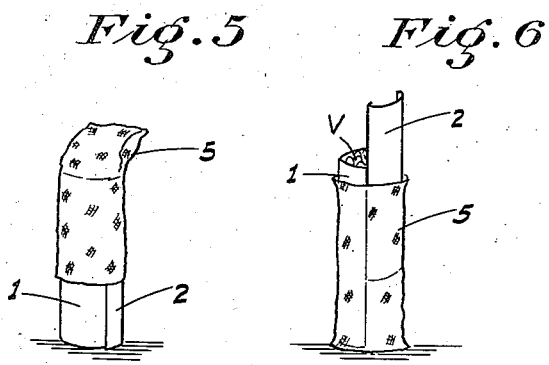
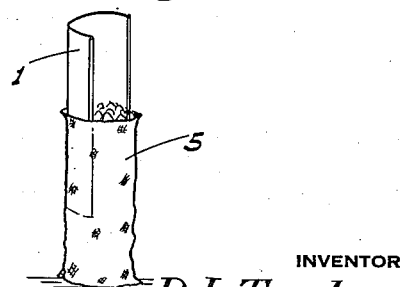
INVENTOR
D. L. Taylor
BY
ATTORNEY Patented Sept. 1, 1936

2,052,854

UNITED STATES PATENT OFFICE 2,052,854

METHOD OF AND MEANS FOR PACKING FRESH VEGETABLES

Don L. Taylor, Winters, Calif., assignor of fifty-one per cent to Lambert Marketing Co., Sacramento, Calif., a corporation Application October 20, 1934, Serial No. 749,234

3 Claims. (Cl. 226—101)

This invention relates to the packing of fresh vegetables for shipment in refrigerator cars and especially to root and top vegetables, such as carrots, beets, spinach etc.

In shipping vegetables across the continent in refrigerator cars it is now customary to precool the produce in order to prevent deterioration of the same before the circulation of cold air from the ice bunkers is effective and to prevent unduly rapid depletion of the bunker ice. Certain vegetables such as peas lend themselves readily to sacking and since the sacks used are very porous so that the cold air readily circulates through the same, a very efficient precooling and refrigerating action generally is had.

Heretofore however it has been considered impossible or at least impracticable to thus ship vegetables of the first recited types on account of their very nature and shape, which makes it hard to place them in sacks. Such vegetables have therefore been packed in wooden crates, and to obtain the necessary precooling action it is customary to place a block of ice in the middle of each crate and which is surrounded by the vegetables. The work incident to placing the ice in the crates not only adds considerably to the expense of packing but also reduces to a large degree the weight and quantity of vegetables actually packed in the crates. Under these conditions a considerable percentage of the freight charge on a carload is paid for a dead or non-profit load, making the net rate for the produce itself relatively high.

It is therefore the principal object of my invention to provide a method and means for conveniently and cheaply sacking vegetables of the above named character so that each sack will carry its full capacity of product. As a result a better precooling and refrigerating action is obtained, the contents of the sacks are visible for inspection without ripping open the sacks; the billing weight of the same amount of produce is reduced since the weight of the wood is eliminated; packing costs both as to labor and material are reduced, and the vegetables may be kept in a better condition since their tops are not apt to be crushed or bent.

Essentially the method consists in initially assembling or loosely packing the vegetables on an exposed surface and in a given area, confining such vegetables in a space symmetrical to but smaller than a sack and then sacking the confined mass as a unit. The method as defined may be carried out in various ways. I have illustrated one way in the accompanying drawing and this has been actually used with complete success.

In the drawing, Figure 1 is a perspective view of the main sacking cylinder or cartridge segment as being loaded.

Figure 2 is an end view of said segment loaded and placed in a press for contraction and for engagement with the complementary segment.

Figure 3 is a view similar to Figure 2 showing the action of the press to bring the cartridge segments together.

Figure 4 is a perspective view of the completely loaded cartridge or cylinder.

Figure 5 is a view showing the placing of a sack over the cartridge.

Figure 6 is a view showing the filled sack as in upright position and the complementary cartridge segment being withdrawn.

Figure 7 is a view showing the main cartridge segment as being withdrawn.

The apparatus by which the method is preferably carried out as shown in the drawing consists essentially of a cylinder or cartridge open at both ends and formed of separate segments 1 and 2. These segments are made of smooth sheet metal of somewhat resilient character and the segment 1 is of considerably greater arcuate extent than the segment 2.

The segment 1 is formed with oppositely facing grooves 3 along its edges while the segment 2 has inturned flanges 4 along its edges to removably and slidably engage in the grooves. When the segments are thus engaged the complete cartridge formed is slightly longer but slightly smaller in diameter than a standard sack 5.

When the cartridge is to be loaded for insertion into a sack the segment 2 is removed, which allows the segment 1 to expand into a relatively wide plate of substantially semi-circular form, as shown in Figure 1, and then of greater radius than the sack. This segment is placed on a packing table T and the vegetables V to be sacked are laid therein in the desired order and so as to completely fill the segment from end to end. When loaded the segment is contracted so that its opposite side edges are moved toward each other sufficiently to make the distance between the grooves 3 the same as that between the flanges 4 of the segment 2. The latter is then mounted on the segment 1 to provide the complete cartridge as shown in Figure 4, and the segment 1 cannot then expand but is retained in its contracted position. This contracting or pressing operation performed on the segment 1 also causes the vegetables to be tightly confined within the cartridge so that they will not spill out when the cartridge is placed on end.

With the cartridge on end a sack is inverted and slipped over the cartridge as shown in Figure 5; the sack with the cartridge therein being then inverted or disposed so that the sack is in a normal upright position. The segment 2 is then gripped at its exposed upper end and slid clear of the segment 1 and out of the sack as shown in Figure 6. This frees the main segment 1 from frictional contact with the vegetables and allows said segment to be withdrawn from the sack as shown in Figure 7 leaving the sack filled with the vegetables. The desired end of easily loading a sack is thus attained, the sack being then sewn closed at its top as usual ready for placement in a refrigerator car.

The segment 2 is withdrawn before the segment 1 on account of the fact that since the complete cartridge holds the vegetables tightly confined, excessive friction is offered to its removal as a single unit. By removing the relatively smaller segment 2 first, a much smaller amount of resistance need be overcome. Then, when the segment 1 expands away from the vegetables the frictional contact therewith is destroyed, since that offered by contact of the expanded cartridge segment with the sack is negligible owing to the smooth action of the sheet metal of which the cartridge is made.

Sacking of these vegetables may also be accomplished by placing a piece of sack material, of a size sufficient to form a sack and of course larger than the segment 1, on the latter while said segment is resting on the table T. The vegetables are assembled on this piece after which the ends of the piece are folded over and the segment 1 is contracted to move its side edges together. This operation also causes the sack material to be folded about the vegetables and the exposed edges of the material which project outwardly of the cartridge segment are then sewed together to form the sack.

The pressing or contracting of the cartridge segment as above described may be carried out by various devices, that shown diagrammatically in Figures 2 and 3, having been found to be very efficient for the purpose. This device comprises a stand 6 having a horizontally disposed concave sheet metal saddle 7 thereon for supporting a loaded cartridge segment. The saddle is anchored against movement along its back edge but is free along its front edge where it is reinforced by a bar 8. Overhanging the saddle 7 is an inverted saddle 9 of the same radius of curvature as the cartridge segment 2. Said saddle is supported by arms 10 which depend behind the saddle 7 and are operatively connected to a treadle 11 so that when the treadle is depressed the arms and saddle 9 will be lowered.

Cables 12 are connected at one end to the ends of the bar 8 and at the other end to the arms 10; passing intermediate their ends over fixed pulleys 13 disposed rearwardly of said arms. In this manner as the arms 10 are lowered toward the saddle 7 the latter is contracted rearwardly a corresponding amount.

In using the press a loaded cartridge segment 1 is placed in the saddle 7 while the latter is in its normal expanded condition and with the saddle 9 relatively raised, as shown in Figure 2. The operator then places the segment 2 under the saddle 9 over the load and holds said segment in place while depressing the treadle. The treadle is depressed sufficiently to cause the saddle 9 to engage and bring the segment 2 into contact with the vegetables as well as with the edges of the segment 1; while the latter is at the same time contracted by the pulling action of the cables 12 sufficient to bring the grooves 3 of the segment 1 a slight distance inwardly of the flanges 4 of the segment 2 as shown in Figure 3. Then when the treadle is released the natural expansion of the segment 1 causes the grooves to be interlocked with the flanges and the cartridge would be then in a complete unitary form. It is then removed from the press for insertion into the sack as previously explained.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. Means to facilitate the packing of produce into sacks comprising a resilient plate of initially substantially semicylindrical form onto which produce sufficient to fill a sack is placed, means to move the spaced edges of the plate toward each other a certain distance, and a segmental plate to complete the cylinder engageable with the first named plate along said edges when the latter are thus moved inwardly.

2. Means to facilitate the packing of produce into a sack comprising a resilient plate of initially substantially semicylindrical form onto which produce sufficient to fill a sack is placed, a contractible cradle on which the plate is supported, said cradle being fixed along one edge, a segmental plate to complete the cylinder adapted to be placed over and rest on the produce on the first plate, and manually operable means applied to the free edge of the cradle and to the segmental plate to first contract the first plate and then lower the segmental plate into cooperative relationship with said first plate; said plates having flanges and grooves along their edges adapted to then engage each other in holding relationship when the contracting pressure on the first plate is released.

3. A structure as in claim 2, in which said manually operable means includes vertically movable arms behind the cradle, means on the arms to engage and depress the segmental plate when the arms are lowered, and means between the arms and the free edge of the cradle to contract the latter with the downward movement of the arms.

DON L. TAYLOR.